US012374807B2

(12) United States Patent
Sato et al.

(10) Patent No.: US 12,374,807 B2
(45) Date of Patent: Jul. 29, 2025

(54) ARRAY ANTENNA

(71) Applicant: DKK Company, Limited, Tokyo (JP)

(72) Inventors: Keisuke Sato, Tokyo (JP); Yusuke Suzuki, Tokyo (JP); Eiji Amakawa, Tokyo (JP)

(73) Assignee: DKK COMPANY, LIMITED, Tokyo (JP)

( * ) Notice: Subject to any disclaimer, the term of this patent is extended or adjusted under 35 U.S.C. 154(b) by 149 days.

(21) Appl. No.: 18/280,716

(22) PCT Filed: Mar. 9, 2022

(86) PCT No.: PCT/JP2022/010318
§ 371 (c)(1),
(2) Date: Sep. 7, 2023

(87) PCT Pub. No.: WO2022/191243
PCT Pub. Date: Sep. 15, 2022

(65) Prior Publication Data
US 2024/0162625 A1 May 16, 2024

(30) Foreign Application Priority Data
Mar. 10, 2021 (JP) ................................ 2021-038790

(51) Int. Cl.
*H01Q 21/06* (2006.01)
*H01Q 1/24* (2006.01)
*H01Q 3/28* (2006.01)

(52) U.S. Cl.
CPC ........... *H01Q 21/061* (2013.01); *H01Q 1/246* (2013.01); *H01Q 3/28* (2013.01)

(58) Field of Classification Search
CPC ........ H01Q 21/061; H01Q 1/246; H01Q 3/26; H01Q 3/28; H01Q 3/30
See application file for complete search history.

(56) References Cited

U.S. PATENT DOCUMENTS

2015/0084832 A1 3/2015 Ai et al.
2015/0349434 A1 12/2015 Yamashita et al.
(Continued)

FOREIGN PATENT DOCUMENTS

CN 102308438 A * 1/2012 ......... H01Q 21/0006
JP 2001-094331 A 4/2001
(Continued)

OTHER PUBLICATIONS

Decision to Grant a Patent issued Dec. 18, 2024 for corresponding Japanese Patent Application No. 2021-038790.
(Continued)

*Primary Examiner* — Hoang V Nguyen
(74) *Attorney, Agent, or Firm* — Faegre Drinker Biddle & Reath LLP

(57) ABSTRACT

An array antenna having multiple elements transmits and receives electromagnetic waves via the elements. The array antenna has an electromagnetic wave control unit that inclines direction of transmission and reception of electromagnetic waves in at least a first direction by emitting electromagnetic waves of mutually different amplitudes or phases at the elements. The array antenna has multiple element columns having two or more N elements aligned at a prescribed interval d1 in a second direction substantially orthogonal to first direction. The element columns are configured as subarrays. The elements are arranged with a prescribed interval d2 therebetween in the first direction to form element rows, and the element columns are disposed offset in first direction by approximately d2/2 from elements or element columns adjacent thereto in second direction. The element column in the outermost element row has more elements than any other element column in the element row other than the outermost element row.

8 Claims, 11 Drawing Sheets

(56) References Cited

U.S. PATENT DOCUMENTS

| | | | | |
|---|---|---|---|---|
| 2017/0207545 | A1 * | 7/2017 | Miraftab | H01Q 3/36 |
| 2018/0309210 | A1 | 10/2018 | Sudo | |

FOREIGN PATENT DOCUMENTS

| | | | | |
|---|---|---|---|---|
| JP | 2003-318647 | A | 11/2003 | |
| JP | 2018-186337 | A | 11/2018 | |
| JP | 2020-198576 | A | 12/2020 | |
| JP | 2021-027465 | A | 2/2021 | |
| WO | WO-2019165984 | A1 * | 9/2019 | H01Q 1/36 |

OTHER PUBLICATIONS

Extended European Search Report issued Feb. 17, 2025 in Application No. 22767197.1.

Written Opinion of the International Searching Authority issued Jun. 14, 2022 in International Application No. PCT/JP2022/010318.

English Summary of Japanese Patent Application No. 2021-038790.

* cited by examiner

ARRAY ANTENNA

TECHNICAL FIELD

The present invention relates to an array antenna having a plurality of elements and transmitting and receiving radio waves via the elements.

BACKGROUND ART

Conventionally, a base station for a mobile terminal or the like forms a wide-angle area with a sector beam having a beam width of about 90 degrees or about 120 degrees. On the other hand, in 5G, from the vie point of improving area quality, there are cases where it is required to steer a narrow high-gain beam with a beam width of 20 degrees or less at wide angle for the sake of simultaneously satisfying both high gain of the antenna and wide-angle area formation. FIG. 21 shows a configuration example of the base station 5 and the relay device 6. Beam #6 and beam #2 are directed from base station 5 toward mobile terminals 701 and 702. On the other hand, the beam is directed via the relay device 6 to the portable terminal 703 behind the building.

In order to realize this configuration, in mobile communications, the development of high-performance antennas that support digital beamforming using multiple devices and analog beamforming using beamforming ICs is underway.

A triangular arrangement as shown in FIG. 23 is known as an arrangement of array antennas that maximizes beamforming performance (see paragraph 0002 and FIG. 27, etc. of Patent Literature 1). With this arrangement, the best beamforming performance can be obtained by appropriately setting the element spacing and freely setting the feeding conditions for each element.

In a case where the amplitude and phase of all the arranged antenna elements are variable, that is, if they can be adjusted freely, the "triangular arrangement" of the antenna arrangement is desirable for antenna gain and for angle range of beam steering, considering the side lobe characteristics, etc. For example, Patent Literature 2 describes that, in the case of a planar array of equilateral triangular arrangement, the distance d between element antennas of a two-element partial array is the same regardless of the combination of two element antennas in any direction (see paragraph 0064).

Hereinafter, a phased array antenna and a beamforming antenna are sometimes simply referred to as an array antenna or an antenna. Also, an antenna element may be simply called an element.

PRIOR ART

Patent Literature

Patent Literature 1 Japanese Patent Laid-Open No. 2021-027465

Patent Literature 2 Japanese Patent Laid-Open No. 2020-198576

SUMMARY OF THE INVENTION

Problems to be Solved by the Invention

First, the difference between a triangular array and a square array is explained.

FIG. 22 shows a configuration example of a square array antenna, and FIG. 23 shows a configuration example of a triangular array antenna.

In the triangular array shown in FIG. 23, adjacent element rows are horizontally shifted by d/2, so the horizontal element spacing can be considered equivalent to an element spacing of d/2. This configuration improves horizontal beamforming performance compared to the square array.

Especially when steering at a wide angle, increase of side lobes, that is, grating lobes, can be suppressed.

In this way, in a triangular array, especially in an equilateral triangular array, when the amplitude and phase of each element are variable, the amplitude and phase conditions can be set freely for each element, and theoretically, the best beamforming performance can be achieved.

However, in order to make all elements variable, it is necessary to freely set the feeding conditions for each element. Therefore, for example, as shown in FIG. 10, the number of amplitude/phase adjusters 10 such as transceiver modules or beamforming ICs corresponding to all the elements 100 must be prepared.

For example, this configuration requires the largest number of BFICs (beam forming ICs) in analog beam forming, which is used in mmWAVE such as the 28 GHz band, or the largest number of transceiver modules in digital beam forming, which is used in Sub6 or the like, leading to problems of increase in cost, increase in power consumption accompanying heat generation.

Therefore, configuration with reduced number of ICs of transceiver modules by sub-arraying to reduce costs are considered next.

FIG. 25 shows a possible configuration example. In an element array 110, two elements 100 within the solid line are designed with fixed amplitude difference and/or phase difference. It should be noted that solid lines indicate combinations and groupings of elements such as sub-arrays. In addition, not all elements are shown with solid lines, including the following description. In other words, elements that are not indicated by a solid line are similarly grouped by two elements 100 and the like.

As shown in FIG. 25, when adjacent elements 100 in the same row are sub-arrayed, the same performance as when the amplitude and phase of each element are variable is obtained for horizontal beam steering.

However, in the vertical direction, the interval between the elements 100 in the subarray is widened to 2×d, and when vertical tilt, that is, vertical beamforming is applied, deterioration such as increase of side lobes occurs.

FIG. 26 shows another possible configuration example. In the element array 110, the two elements 100 within the solid line are controlled with the same amplitude and phase.

In this configuration, the element spacing in the vertical direction returns to d, and the vertical tilt is improved. On the other hand, since the element spacing is d in the horizontal direction, the degree of freedom of phase and amplitude at d/2 cannot be obtained for horizontal steering.

When elements are sub-arrayed to reduce the number of ICs or transceiver modules for cost reduction, the beam forming performance is degraded as described above.

It is required to solve such problems and optimize cost performance in beamforming antennas of mobile communication base stations.

In addition, from the viewpoint of improving the communication quality of transmission and reception, such as increasing transmission EIRP or reducing noise in the reception system, it is desirable to have a high antenna gain, however, when it is desired to secure performance during beamforming with the high antenna gain, it is necessary to narrow the antenna element interval and reduces the antenna aperture and reduces the gain.

Assuming that sub-arrays are used for the purpose of cost reduction, arrangement which increases array gain, in other words, highly efficient arrangement, while maintaining wide beam steering angle range on the horizontal side, is considered below.

In particular, there is demand for an array antenna with array arrangement assuming sub-arrays, which achieves decrease of the number of the transceiver modules or BFICs, broadening of the beam steering angle range in the horizontal direction, and higher array gain, that are required to beamforming antennas for mobile communications regardless of whether they are digital or analog.

Accordingly, it is an object of the present invention to provide an array antenna that achieves both low cost and optimum horizontal beamforming performance.

Another object of the present invention is to provide an array antenna that simultaneously satisfies the three conditions of low cost, optimization of horizontal beamforming performance, and high antenna gain.

A further object is to provide an array antenna that satisfies the above objects and is applicable regardless of frequency, for example, applicable to both SUB6 and mmWAVE when considering application to current mobile communications.

Means for Solving the Problems

In mobile communications, horizontal beamforming is prioritized, so an arrangement method that can maintain horizontal beamforming performance is desired. In beam forming in a base station antenna for mobile communication, there are many cases where a wide beam steering angle range on the horizontal side is required compared to the beam tilt on the vertical side.

Therefore, when the number of receiver modules or beam forming ICs is reduced, the vertical side antenna elements are sub-arrayed as sub-arrays of two or more elements, and the horizontal beam steering angle range is maintained in the same way as when all elements are variable, to achieve cost reduction while preferentially improving horizontal beamforming performance.

An array antenna according to one embodiment of the present invention comprises a plurality of elements and configured to transmit and receive electromagnetic waves via the elements, comprising: an electromagnetic wave control unit, configured to incline the direction of transmission and reception of electromagnetic waves in at least a first direction by emitting electromagnetic waves of mutually different amplitudes or mutually different phases at the plurality of elements, wherein the array antenna has a plurality of element columns in which two or more N elements are aligned at a prescribed interval d1 in a second direction substantially orthogonal to the first direction, the element columns are configured as sub arrays, the elements are arranged with a prescribed interval d2 therebetween in the first direction to form element rows, and the element columns are disposed offset in the first direction by substantially d2/2 from elements or element columns adjacent thereto in the second direction.

In an array antenna according to one embodiment of the present invention, the element column in the outermost element row has more elements than any other element column in the element row other than the outermost element row.

In an array antenna according to one embodiment of the present invention, the element columns in the element rows outside a predetermined center position has the number of elements equal to or greater than the number of the elements in any other element column in the element row on the center position side.

An array antenna according to one embodiment of the present invention has an array group on the outermost side in the first direction, and the array group has a plurality of the element rows in the first direction.

An array antenna according to one embodiment of the present invention has a plurality of array groups outside in the first direction, and the array group has a plurality of rows of the elements in the first direction, and, in the first direction, outer array group has a number of the element rows greater than or equal to those of inner array group.

In an array antenna according to one embodiment of the present invention, the element row which has the least element has one said element.

In an array antenna according to one embodiment of the present invention, said d2 is approximately $\lambda/2$ and said d1 is $0.5\lambda$ or more where $\lambda$ is the wavelength of the electromagnetic wave to be transmitted and received.

An array antenna according to one embodiment of the present invention is a base station antenna or a relay antenna of a mobile terminal, and the first direction is substantially horizontal.

Effect of the Invention

By sub-arraying the antenna elements on the vertical side as sub-arrays of two or more elements and maintaining the same horizontal beam steering angle range as in the case where all elements are variable, the horizontal beam forming performance is preferentially improved while realizing cost reduction.

DETAILED DESCRIPTION

Figure 1:
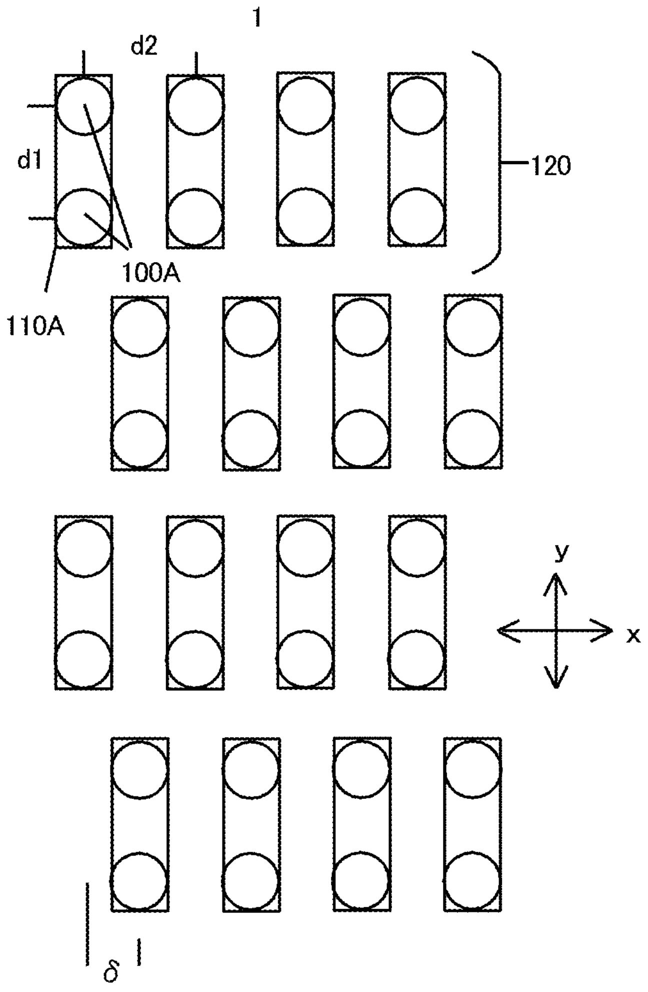
FIG. 1 shows a configuration example of an array antenna in one embodiment of the present invention.
Figure 4:
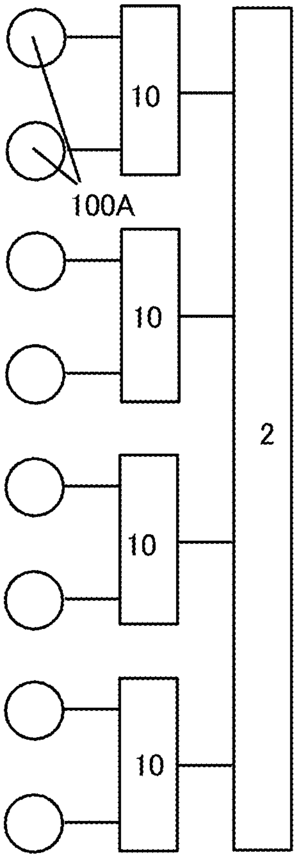
FIG. 4 shows a configuration example of an array antenna in one embodiment of the present invention.

FIGS. 1 and 4 show a configuration example of an array antenna 1 according to an embodiment of the present invention.

The array antenna 1 has a plurality of elements 100, transmits and receives radio waves via the elements 100, and has a subarray 110 in the vertical direction in the drawing.

As shown in FIG. 1, there are a plurality of element columns 110 in which two or more N elements 100 are arranged at a predetermined interval d1 in a second direction y substantially orthogonal to the first direction x.

In this embodiment, for example, two elements 100A form one element columns 110A.

The elements 100 form an element row 120 arranged at a predetermined interval d2 in the first direction x.

In addition, the element row is arranged with a deviation of approximately d2/2 in the first direction from the adjacent element 100 or element row 110 in the 40 second direction y. Note that this deviation is indicated as δ in the figure.

Figure 2:
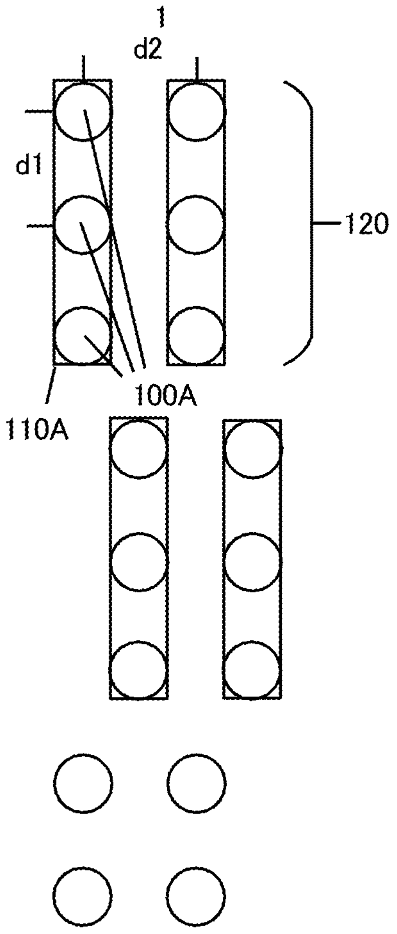
FIG. 2 shows a configuration example of an array antenna in one embodiment of the present invention.

In this embodiment, one element row 110 has two elements 100, but configuration with one element low 110 which has three elements 100, such as the configuration where one element low 110A has three elements 100A as shown in FIG. 2, is also included.

Figure 3:
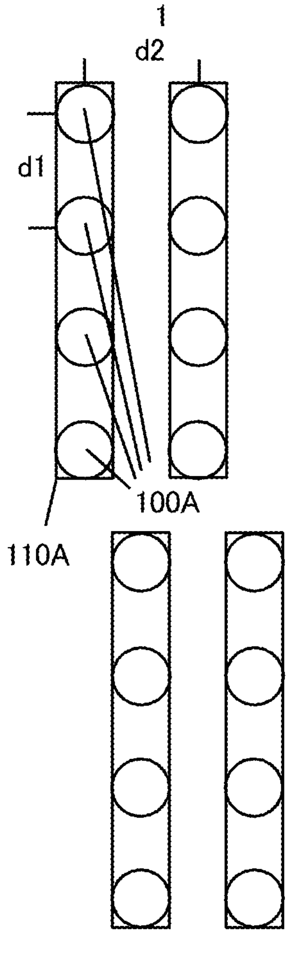
FIG. 3 shows a configuration example of an array antenna in one embodiment of the present invention.

Alternatively, one element row 110 may have four elements 100 in one of the configurations, such as one element row 110A having four element rows 100A as shown in FIG. 3.

The solid line in the figure indicates the grouping of the element arrays, which are designed with fixed amplitude and phase differences. Also, it should be noted that grouping is not shown for all elements as in FIG. 3, and that not all elements are necessarily shown, which also applies to the following description.

As shown in FIG. 4, each element 100 is connected to the same amplitude/phase adjustment unit 10 for each element row 110, and the amplitude/phase adjustment unit 10 is connected to the radio wave control unit 2.

For example, two elements 100A of the element array 110A are connected to one amplitude/phase adjustment unit 10.

The radio wave control unit 2 controls the amplitude and phase of each element column, and causes the plurality of elements 100 to emit radio waves with different amplitudes or phases, thereby tilting the transmission/reception direction of the radio waves at least in the first direction.

Figure 5:
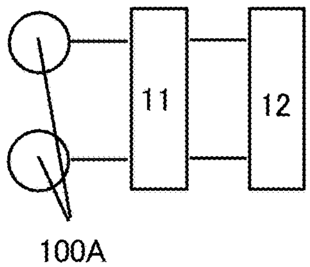
FIG. 5 shows a configuration example of an array antenna in one embodiment of the present invention.

In this embodiment, each element array 110 is connected to the same amplitude/phase adjustment unit 10, but the configuration may be connected to the same amplify unit 11 and phase shift unit 12 for each element array 110 as shown in FIG. 5.

Figure 6:
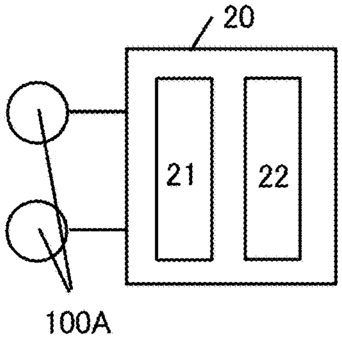
FIG. 6 shows a configuration example of an array antenna in one embodiment of the present invention.

Alternatively, a subarray control unit 20 may be provided for each element array 110, and the subarray control unit 20 may have an amplify unit 21 and a phase shift unit 22 as shown in FIG. 6.

The element row 110 is a sub-array. In other words, the elements 100 in the same element column 110 are controlled by the same amplitude/phase adjust unit 10.

In one embodiment, d2 can be approximately λ/2 and d1 can be 0.5λ or more where λ is the wavelength of the electromagnetic wave to be transmitted or received.

With this configuration, it is possible to achieve an optimum gain by adjusting the value of d1 while efficiently tilting in the horizontal direction. That is, by increasing the value of d1 as much as possible, the array gain can be increased, and the offset δ can be used to artificially reduce the element spacing, thereby maintaining wide angular range of horizontal beam steering.

In one embodiment, it is a base station antenna or a relay antenna of a mobile terminal, and the first direction is substantially horizontal.

Figure 21:
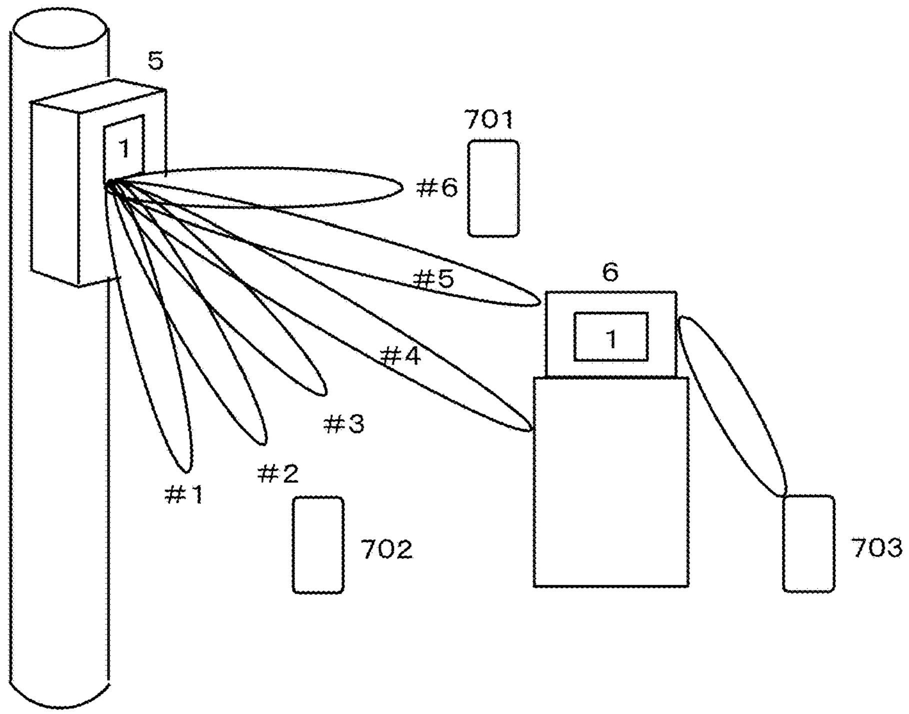
FIG. 21 shows a configuration example of a base station and a relay device in one embodiment of the present invention.
Figure 23:
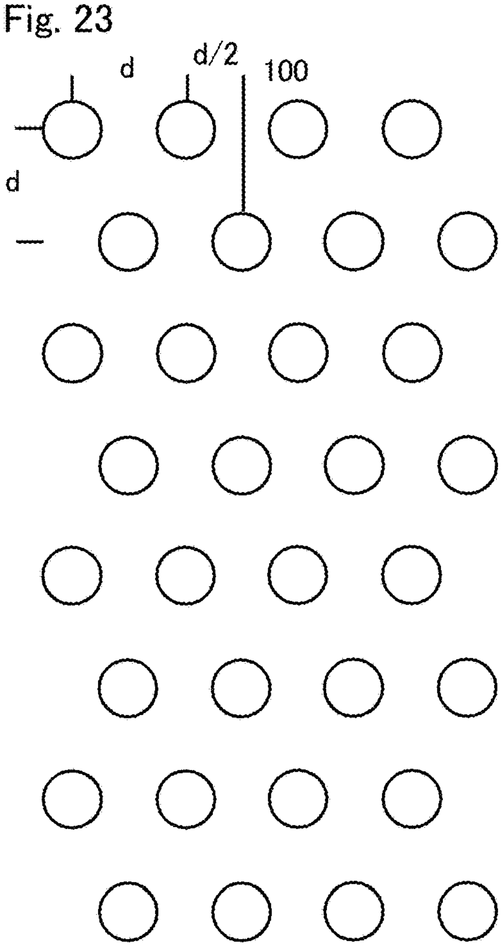
FIG. 23 shows a configuration example of an array antenna in one embodiment of the present invention.
Figure 22:
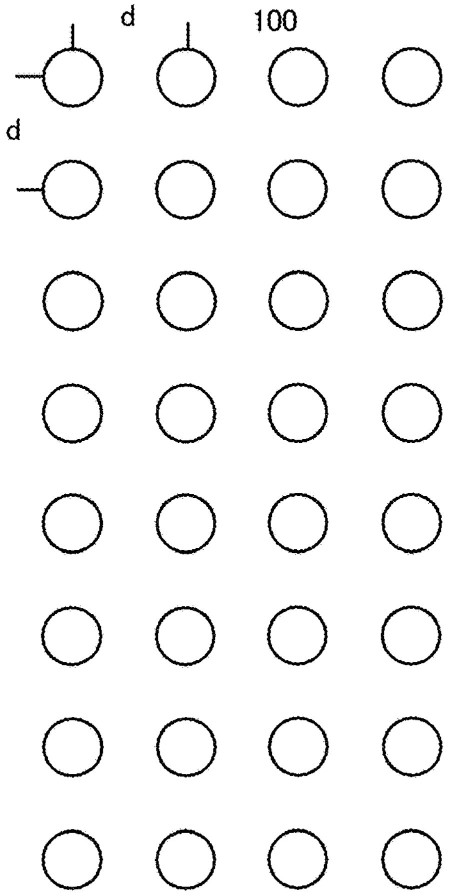
FIG. 22 shows a configuration example of an array antenna in one embodiment of the present invention.
Figure 24:
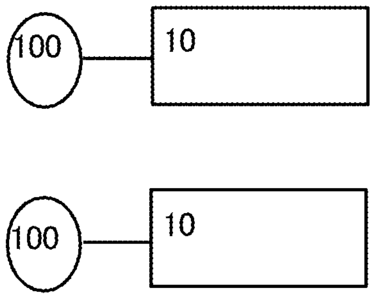
FIG. 24 shows a configuration example of an array antenna in one embodiment of the present invention.
Figure 26:
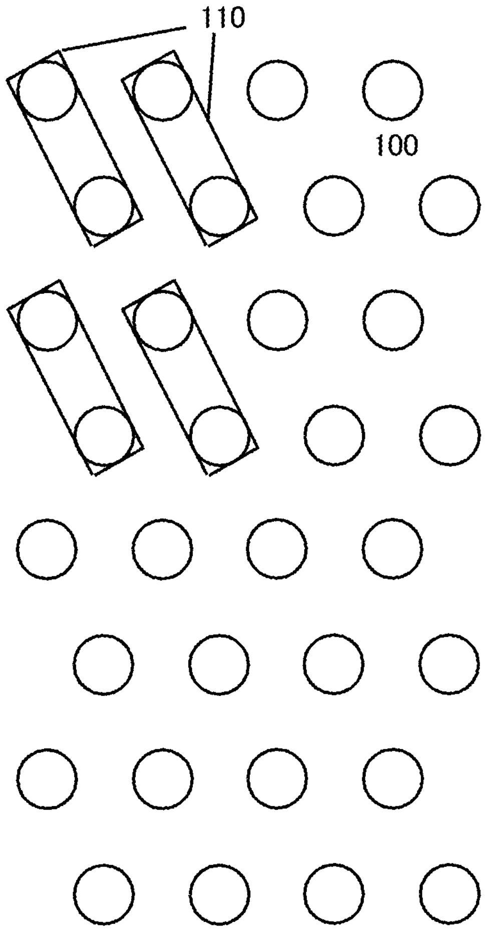
FIG. 26 shows a configuration example of an array antenna in one embodiment of the present invention.
Figure 25:
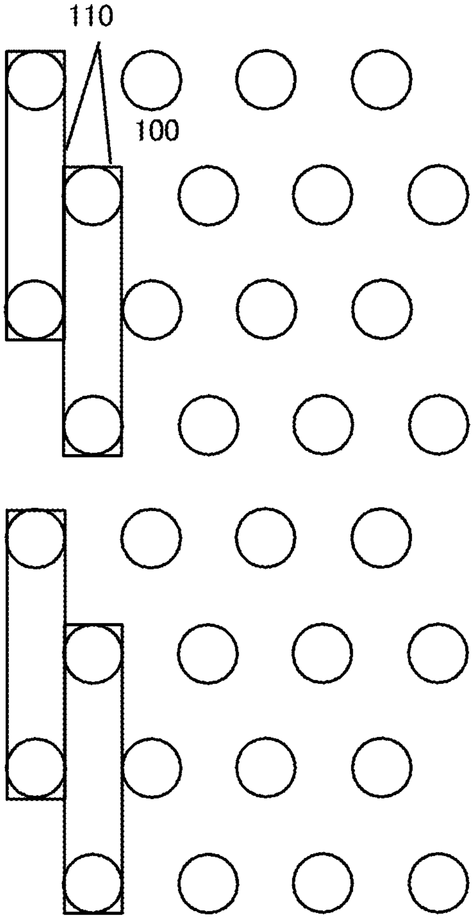
FIG. 25 shows a configuration example of an array antenna in one embodiment of the present invention.

As shown in FIG. 21, the base station 5 has this array antenna 1 as a base station antenna. The relay device 6 has this present array antenna 1 as a relay antenna.

In these embodiments, array antennas formed into sub-arrays with an element spacing of d1 in the vertical direction are arranged with an element spacing of d2 in the horizontal direction, and the vertical sub-array group in the next row is aligned horizontally offset by offset amount of δ=d2/2.

In this configuration, an array antenna column is configured with an interval of d2/2 in the horizontal direction. As a result, the phase difference between the horizontal elements can be set at intervals of d2/2, thereby suppressing the generation of grating lobes.

In addition, in the vertical direction, although the performance of beam tilt is limited by the sub-array, it can be adjusted flexibly to some extent by the two-element sub-array spacing d1.

In this embodiment, offset is in the horizontal direction, but if wide-angle steering is required on the vertical tilt side, the configuration may be rotated by 90 degrees. That is, the first direction x may be horizontal and the second direction y may be vertical in a configuration.

Alternatively, the first direction x may be the direction requiring the widest tilt. Furthermore, the first direction x may be the direction that requires the widest tilt angle, and the second direction y may be the direction that requires the next widest tilt angle among the directions orthogonal to the first direction x in a configuration.

Figure 7:
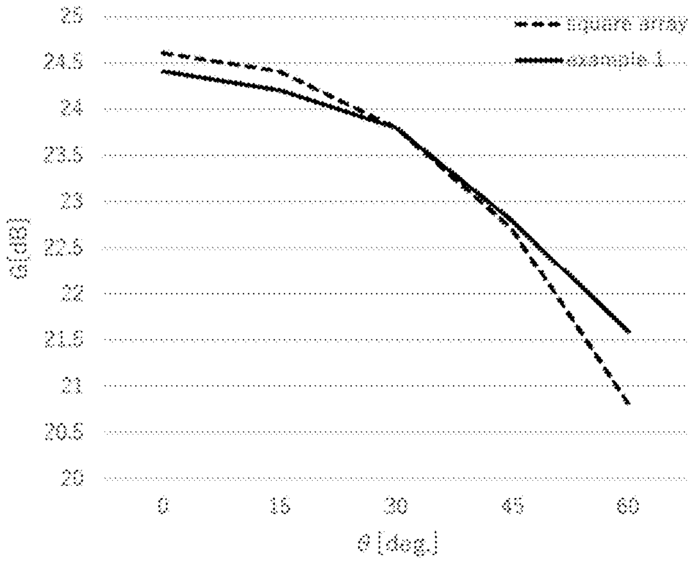
FIG. 7 shows a comparison between an embodiment of the invention and a square array.

FIG. 7 compares this embodiment with a square arrangement, and shows the relationship between the horizontal steering angle θ and the antenna gain G. The values for this example are shown in solid lines as Example 1, and the square array values are shown in dashed lines.

In this configuration, arrangement with a horizontal offset of d2/2 with respect to the subarray group is applied.

Because the horizontal phase difference can be set at intervals of d2/2, the generation of graded lobes is suppressed and the gain reduction is prevented.

In wide-angle steering in the horizontal direction, such as a steering angle of 60 degrees, the gain of this embodiment is improved by about 1 dB compared to the square arrangement.

Also, the difference between the maximum gain when the steering angle is 0 degrees and the antenna gain when the steering angle is 60 degrees is within 3 dB, such that the decrease in antenna gain due to steering is kept small.

In this way, even when the sub-array configuration is applied, while it is effective for wide-angle steering in the horizontal direction, the maximum gain of the antenna can be maintained almost the same as in the case of a square array.

In the above configuration, by making a triangular array for each subarray, it is possible to achieve both the optimization of horizontal beamforming performance and the reduction of cost.

In particular, the configuration achieves both wide-angle steering and high-gain performance in beamforming antennas based on sub-arrays. Reducing the number of ICs and transceiver modules also leads to cost reduction. Also, any frequency is applicable regardless of SUB6 and mmWAVE.

In particular, it greatly improves the characteristics of beamforming antenna with sub-arrays.

By the way, the antenna gain obtained with an array antenna is proportional to the antenna aperture, that is, the area of the array antenna.

Considering the performance during beam steering, especially the increase of side lobes, the element spacing should be narrow. However, if the element spacing is narrow, the antenna aperture will be small for the same number of elements, resulting in a decrease in gain. In other words, it is necessary to widen the antenna aperture in order to improve the antenna gain.

By increasing the number of elements in the external sub-arrays, such as the outermost sub-arrays among the vertical sub-arrays, compared to the central sub-arrays, antenna gain can be improved as the aperture is increased, while the performance during horizontal steering is kept the same as in the above-described embodiment. Such a configuration will be described below.

Figure 8:
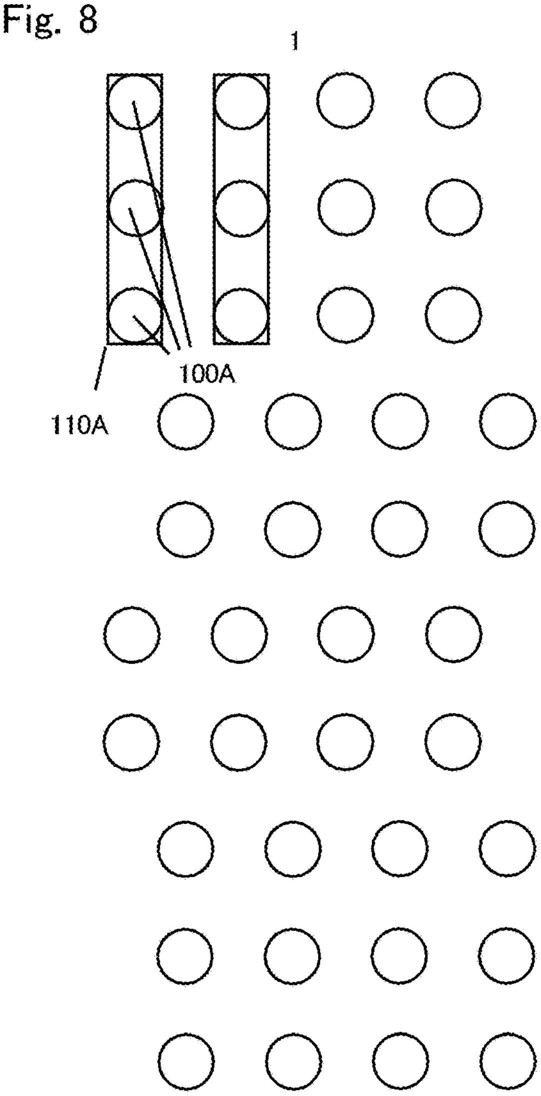
FIG. 8 shows a configuration example of an array antenna in one embodiment of the present invention.

FIG. 8 shows a configuration example of the array antenna 1 in one embodiment of the present invention.

In this embodiment, the element columns 110 in the outermost element rows 120 have more elements 100 than the element columns 110 in the element rows 120 other than the outermost element rows. For example, element column 110A in outermost element row 120 has three elements 100A.

In this configuration, the element column 110 in the outermost element row 120 has three elements 100, and the element columns 110 in element rows 120 other than the outermost element row have two elements 100.

Figure 10:
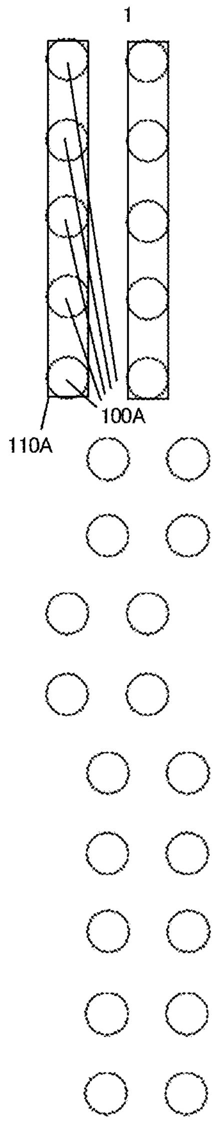
FIG. 10 shows a configuration example of an array antenna in one embodiment of the present invention.
Figure 9:
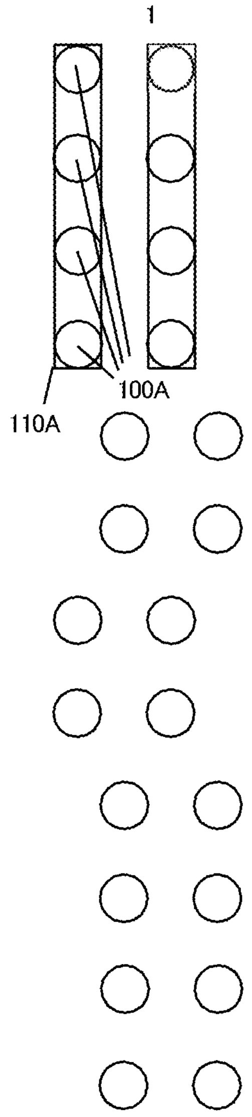
FIG. 9 shows a configuration example of an array antenna in one embodiment of the present invention.

The element column 110 in the outermost element row 120 may be configured with four elements 100 as shown in FIG. 9. Alternatively, a configuration having five elements 100 as shown in FIG. 10 may be used.

An optimum antenna gain can be achieved by setting the number of elements in the element column 110 in the outermost element row 120 according to the desired antenna gain.

Figure 11:
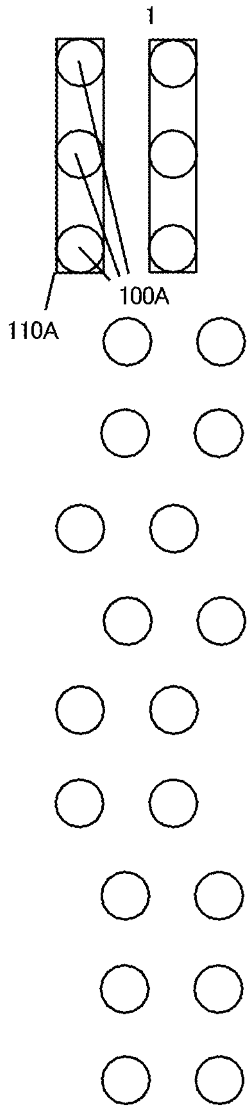
FIG. 11 shows a configuration example of an array antenna in one embodiment of the present invention.

FIG. 11 shows a configuration example of the array antenna 1 in one embodiment of the present invention.

In this embodiment, the element columns 110 in the element rows 120 outside the predetermined center position have elements 100 that are greater than or equal to the elements 100 in the element columns 110 in the element rows 120 on the center position side. In this embodiment, the center position is the center of the arrangement of the elements 100, for example, the middle position of the outermost elements 100 in the horizontal x and vertical y directions, but depending on the performance of the antenna, it may not necessarily be the center.

In this embodiment, the element column 110 in the outermost element row 120 with respect to the predetermined center position has three elements 100, and the element column 110 in the next outer element row 120 with respect to the predetermined center position has two elements 100, and the other element column 110 in the inner element row 120 has one element 100. Only one element is connected to the amplitude/phase adjustment unit 10 in the inner element row 120 of this example, and it should be noted that one element is considered to be formed as one element column in such a configuration.

Figure 12:
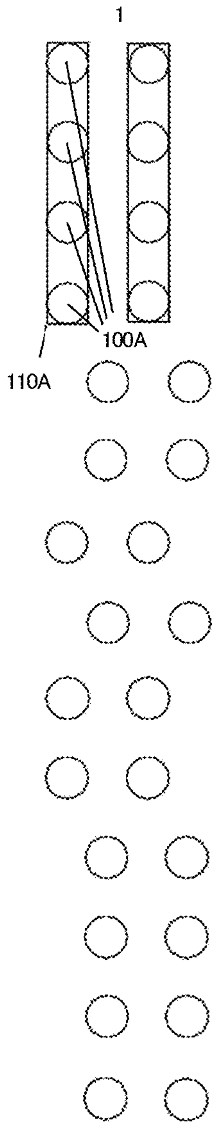
FIG. 12 shows a configuration example of an array antenna in one embodiment of the present invention.

As in the example shown in FIG. 12, the element columns 110 in the outermost element row 120 with respect to the given center position may have four elements 100, the next outer element columns 110 with respect to the given center position may have two elements 100, and the other element columns 110 at the element row 120 inside may have one element 100 in one configuration.

Figure 13:
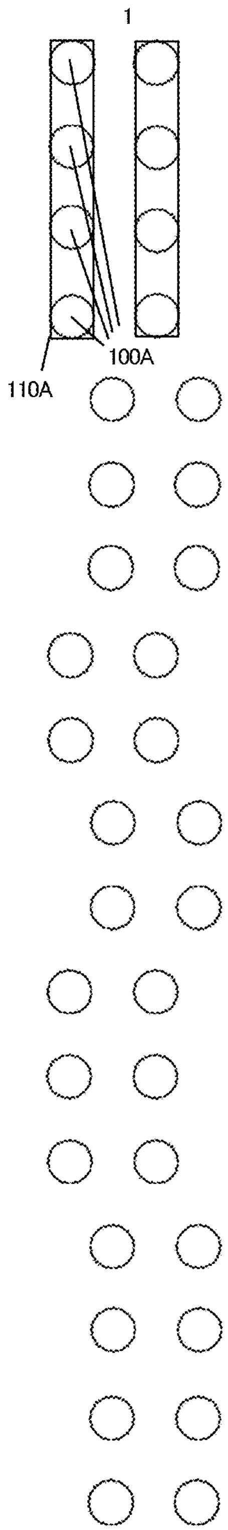
FIG. 13 shows a comparison between an embodiment of the invention and a square array.

Alternatively, as shown in FIG. 13, the element columns 110 in the outermost element row 120 with respect to the given center position may have four elements 100, the next outer element columns 110 with respect to the given center position may have three elements 100, and the other element columns 110 at the element row 120 inside may have two elements 100 in one configuration.

As in these examples, when the number of elements in the element row 120 smoothly increases from the center position side toward the outside, in other words, in a configuration in which the number of elements increases in several stages, it is easy to adjust the amplitude ratio for side lobe suppression. In other words, when looking at the array antenna as a whole, compared to the case where the number of elements in the outermost element row increases abruptly, the amplitude can be smoothly changed, and side lobes can be suppressed.

Figure 14:
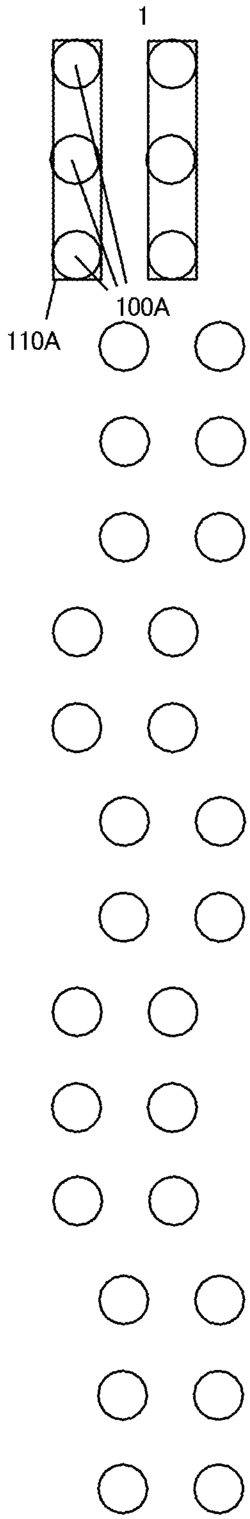
FIG. 14 shows a configuration example of an array antenna in one embodiment of the present invention.

As in the example shown in FIG. 14, the element columns 110 in the outermost element row 120 with respect to the given center position may have three elements 100, the next outer element columns 110 with respect to the given center position may have three elements 100, and the other element columns 110 at the element row 120 inside may have two elements 100 in one configuration.

Figure 15:
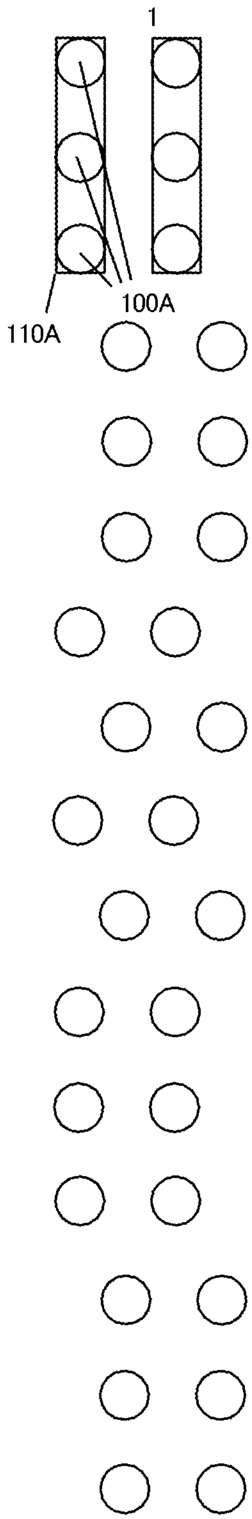
FIG. 15 shows a configuration example of an array antenna in one embodiment of the present invention.

Alternatively, as shown in FIG. 15, the element columns 110 in the outermost element row 120 with respect to the given center position may have three elements 100, the next outer element columns 110 with respect to the given center position may have three elements 100, and the other element columns 110 at the element row 120 inside may have one element 100 in one configuration.

Figure 16:
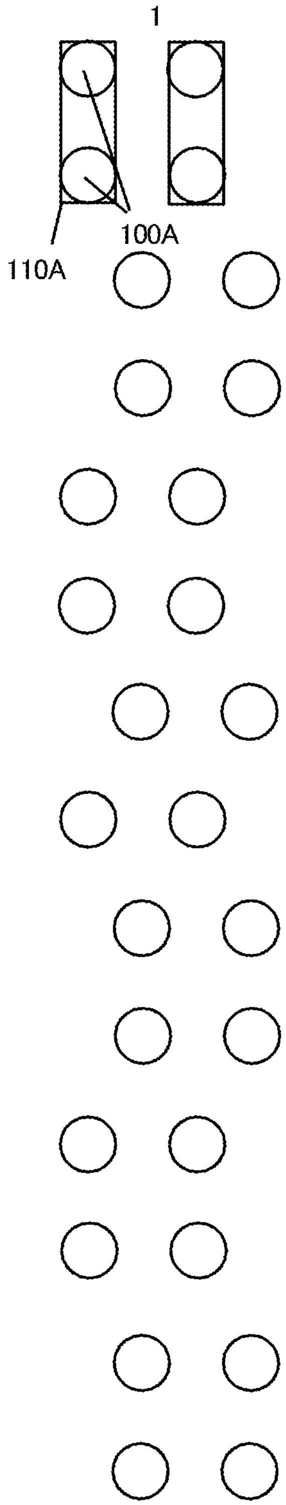
FIG. 16 shows a configuration example of an array antenna in one embodiment of the present invention.

Alternatively, as shown in FIG. 16, the element columns 110 in the outermost three element rows 120 with respect to the predetermined center position may be configured to have two elements 100, and the element columns 110 in the inner element rows 120 may be configured to have one element 100.

Also in these configurations, side lobes can be suppressed more efficiently.

Figure 18:
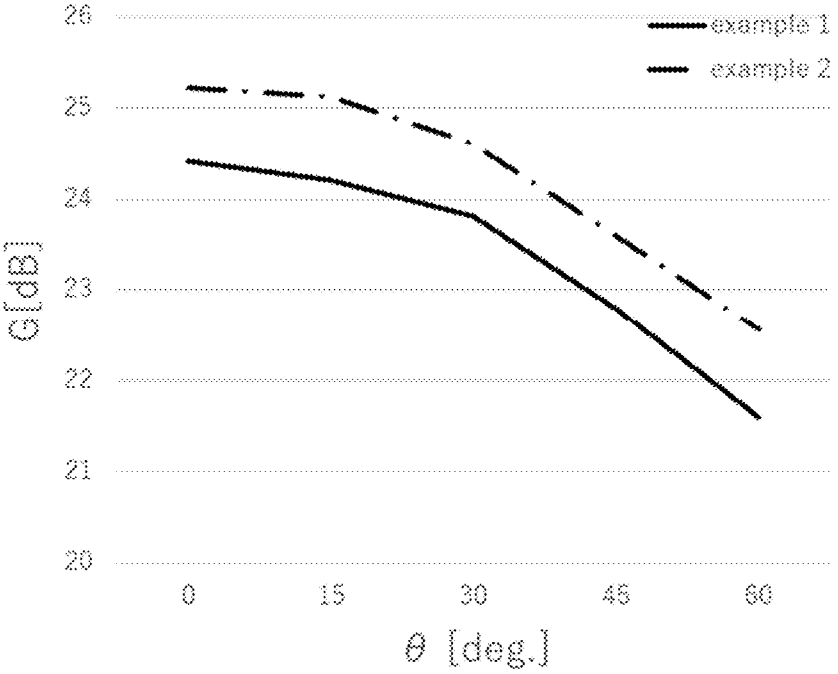
FIG. 18 shows a comparison between an embodiment of the invention.

FIG. 18 is the comparison of Example 1 and Example 2 to show the relation of the steering angle θ and the antenna gain G, where Example 2 is a configuration in which that the element column 110 in the outermost element rows 120 have three elements 100 and the element columns 110 in the element rows 120 other than the outermost element row have two elements 100, while Example 1 is a configuration in which the elements column 110 have two elements as described above. Values for example 1 are shown in solid lines and values for example 2 are shown in dashed lines.

In example 2, the gain is improved by about 1 dB over example 1 in the steering angle range due to the widening of the aperture.

In this way, it is possible to improve gain while maintaining horizontal steering performance.

Figure 17:
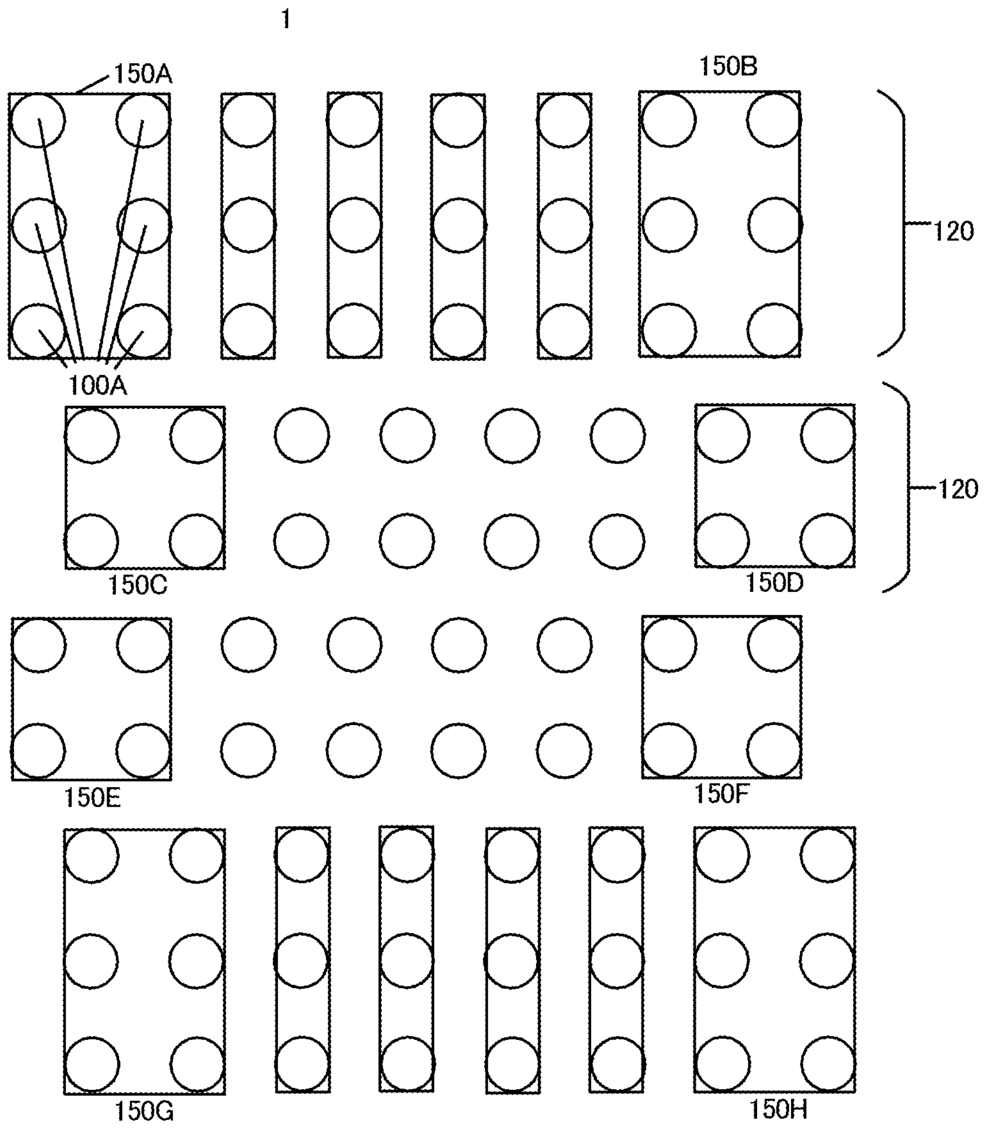
FIG. 17 shows a configuration example of an array antenna in one embodiment of the present invention.

FIG. 17 shows a configuration example of the array antenna 1 in one embodiment of the present invention.

It has an outermost array group 150 in the first direction x, and the array group 150 has a plurality of element columns 110 in the first direction x.

As shown in FIG. 17, the array group 150A has two element columns 110 and each element column has three elements 100A. The same is true for the other outermost array groups 150B, 150G, 150H in the first direction x and the second direction y. Among the outermost array groups in the first direction x and the second direction y, the array groups 150C, 150D, 150E, and 150F that are not the outermost in the second direction y have two element columns 110, and each element column has two elements 100.

The array group is configured as sub-arrays and controlled with the same amplitude and phase. In this embodiment, one array group is connected to the same amplitude/phase adjusting unit 10, but other configurations may be used as long as they are controlled with the same amplitude/phase.

In this embodiment, the number of elements is also increased for the horizontal outermost sub-arrays for which steering performance is desired. In this embodiment, the number is increased by one element, that is, by one element column.

In this way, the gain increases as the aperture widens.

This configuration is effective when higher antenna gain is desired without increasing the number of BFICs or transceiver modules.

As shown in FIG. 18, the array group 150 can also be configured to have three element columns 110.

Figure 19:
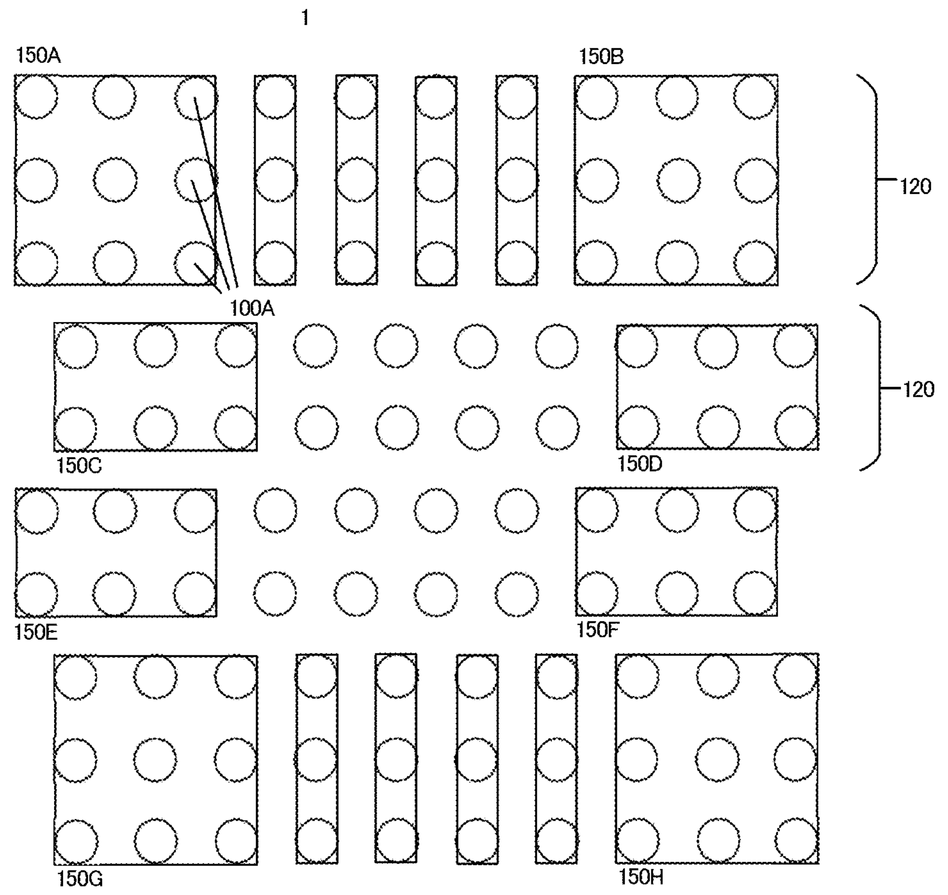
FIG. 19 shows a configuration example of an array antenna in one embodiment of the present invention.
Figure 20:
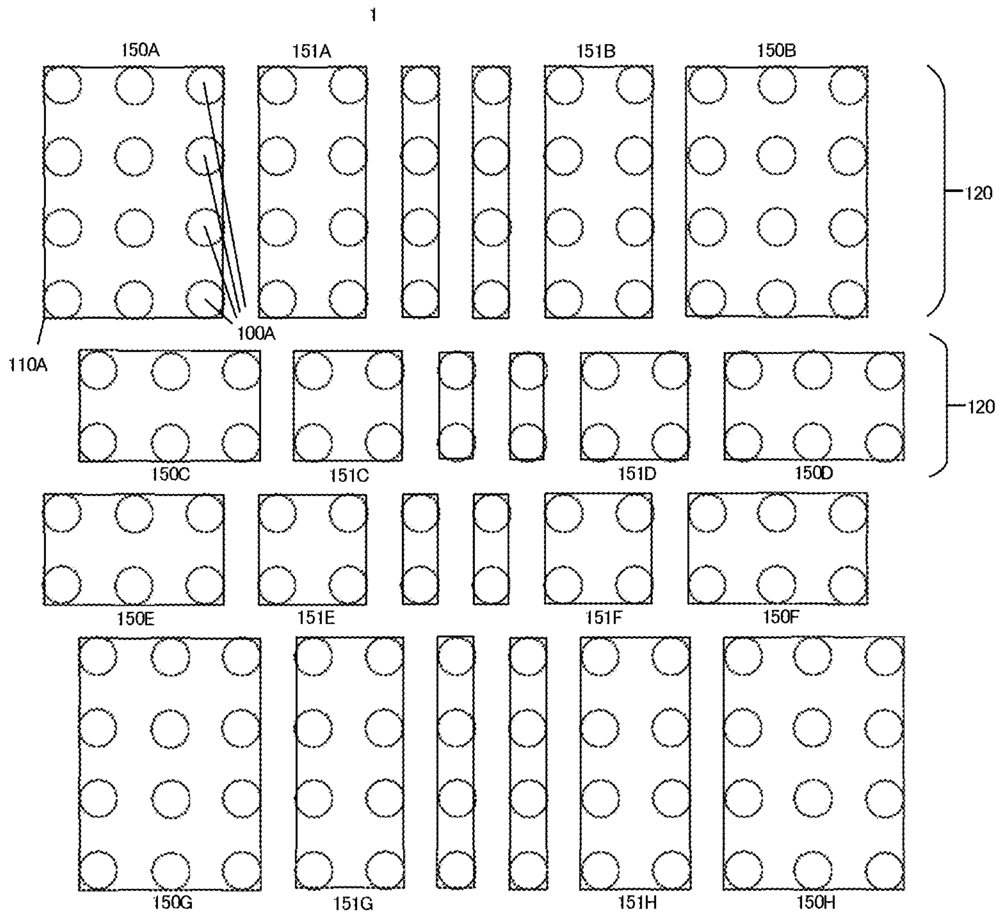
FIG. 20 shows a configuration example of an array antenna in one embodiment of the present invention.

FIG. 19 shows a configuration example of the array antenna 1 in one embodiment of the present invention.

The array antenna 1 has a plurality of array groups 150, 151 outside in the first direction x. This embodiment has a total of 16 array groups: array groups 150A, 150B, 150C, 150D, 150E, 150F, 150G, 150H, 151A, 151B, 151C, 151D, 151E, 151F, 151G, and 151H.

The array group 150 has multiple columns of element columns 110 in the first direction x. For example, array group 10A has three element rows 110A. Each element row 110A has four elements 100A.

In the first direction, the outer array groups 150A to 150H have more element columns than the inner array groups 151A-151H. In this embodiment, the outer array groups 150A to 150H have three element columns 110, and the inner array groups 151A to 151H have two element columns 110, respectively.

As in this configuration, when the number of element columns included in the array group increases in several steps even in the horizontal direction, side lobes can be suppressed more effectively in the horizontal direction as well.

In the above embodiments, it is possible to realize an array antenna that simultaneously satisfies the three objectives of optimizing horizontal beamforming performance, reducing cost, and increasing gain.

As described in each of the above embodiments, the arrangement of the subarrays can be devised to increase the gain during beam steering in the horizontal direction. Antenna gain can be increased by changing the number of elements in the sub-array between the outer side and the central side. Sub-arrays can reduce the number of ICs and transceiver modules, and reduce costs.

Any of the above embodiments can be applied to beamforming antennas regardless of SUB6/mmWAVE.

In addition, in an antenna array that assumes a sub-array, it is possible to achieve high efficiency, that is, an improvement in array gain, while maintaining a wide angular range of horizontal beam steering.

It goes without saying that the present invention is not limited to the above examples, and includes various examples without departing from the scope of the present invention.

For example, instead of a planar antenna, the invention can be effectively provided as an antenna on a curved surface.

The invention is also applicable to standards other than 5G.

EXPLANATION OF REFERENCE NUMERALS

1 array antenna
2 radio wave control unit
5 base station
6 relay device
701, 702, 703 mobile terminal
10 amplitude/phase adjustment unit
11, 21 amplify unit
12, 22 phase shift unit
20 subarray control unit
100, 100A element
110, 110A element column
120 element row
150, 150A, 150B, 150C, 150D, 150E, 150F, 150G, 150H, 151, 151A, 151B, 151C, 151D, 151E, 151F, 151G, 151H array group

The invention claimed is:

1. An array antenna comprising a plurality of elements and configured to transmit and receive electromagnetic waves via the elements, comprising:

an electromagnetic wave control unit, configured to incline the direction of transmission and reception of electromagnetic waves in at least a first direction by emitting electromagnetic waves of mutually different amplitudes or mutually different phases at the plurality of elements, wherein the array antenna has a plurality of element columns in which two or more N elements are aligned at a prescribed interval d1 in a second direction substantially orthogonal to the first direction, the element columns are configured as sub arrays, the elements are arranged with a prescribed interval d2 therebetween in the first direction to form element rows, the element columns are disposed offset in the first direction by substantially d2/2 from elements or element columns adjacent thereto in the second direction, and the element column in the outermost element row has more elements than any other element column in the element row other than the outermost element row.

2. The array antenna according to claim 1, wherein the element column in the outermost element row have more elements than any other element column in the element row other than the outermost element row.

3. The array antenna according to claim 1, wherein the element columns in the element rows outside a predetermined center position has the number of elements equal to or greater than the number of the elements in any other element column in the element row on the center position side.

4. The array antenna according to claim 3, wherein the element row which has the least element has one said element.

5. The array antenna according to claim 1, wherein the array antenna has an array group on the outermost side in the first direction, and the array group has a plurality of the element rows in the first direction.

6. The array antenna according to claim 1, wherein the array antenna has a plurality of array groups outside in the first direction, and the array group has a plurality of rows of the elements in the first direction, and in the first direction, outer array group has a number of the element rows greater than or equal to those of inner array group.

7. The array antenna according to claim 1, wherein said d2 is approximately λ/2 and said d1 is 0.5λ or more where λ is the wavelength of the electromagnetic wave to be transmitted and received.

8. The array antenna according to claim 1, wherein the array antenna is a base station antenna or a relay antenna of a mobile terminal, and the first direction is substantially horizontal.

* * * * *